(12) United States Patent
Hwang et al.

(10) Patent No.: US 7,545,710 B2
(45) Date of Patent: *Jun. 9, 2009

(54) METHOD OF OVERWRITING DATA IN WRITE-ONCE INFORMATION STORAGE MEDIUM AND DATA RECORDING AND/OR REPRODUCING APPARATUS FOR WRITE-ONCE INFORMATION STORAGE MEDIUM

(75) Inventors: Sung-hee Hwang, Seoul (KR); Jung-wan Ko, Suwon-si (KR); Kyung-geun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/782,022

(22) Filed: Jul. 24, 2007

(65) Prior Publication Data

US 2007/0266210 A1 Nov. 15, 2007

Related U.S. Application Data

(63) Continuation of application No. 10/806,347, filed on Mar. 23, 2004, now Pat. No. 7,272,086.

(60) Provisional application No. 60/456,559, filed on Mar. 24, 2003, provisional application No. 60/473,894, filed on May 29, 2003.

(30) Foreign Application Priority Data

| Mar. 24, 2003 | (KR) | ................................ 2003-18213 |
| Aug. 30, 2003 | (KR) | ................................ 2003-60545 |
| Mar. 3, 2004 | (KR) | ................................ 2004-14247 |

(51) Int. Cl.
G11B 27/36 (2006.01)

(52) U.S. Cl. ................................ 369/47.14; 369/53.16

(58) Field of Classification Search .............. 369/47.14, 369/53.16, 53.17
See application file for complete search history.

(56) References Cited

U.S. PATENT DOCUMENTS 5,214,781 A 5/1993 Miki et al.

(Continued)

FOREIGN PATENT DOCUMENTS

CN 1168182 A 12/1997

(Continued)

OTHER PUBLICATIONS

U.S. Appl. No. 10/806,347, filed Mar. 23, 2004, Hwang et al., Samsung Electronics Co., Ltd.

(Continued)

*Primary Examiner*—Thang V Tran
(74) *Attorney, Agent, or Firm*—Stein McEwen, LLP

(57) ABSTRACT

A method of overwriting data in a write-once information storage medium and a data recording and/or reproducing apparatus therefor. In the data overwriting method, a command to overwrite new data in a first area of the write-once information storage medium where data has already been recorded is issued. Then, the first area is considered as a defective area, and the new data is recorded in a second area. Thereafter, updated defect management information, including information about the locations of the first and second areas, is recorded in the write-once information storage medium. Accordingly, overwriting can be performed in write-once information storage media, which is incapable of physical overwriting, by using a logical overwriting technique. Thus, data recorded in the write-once information storage medium may be changed or updated.

5 Claims, 6 Drawing Sheets

U.S. PATENT DOCUMENTS

| | | |
|---|---|---|
| 5,475,820 A | 12/1995 | Natrasevschi et al. |
| 5,978,812 A | 11/1999 | Inokuchi et al. |
| 7,031,239 B2 | 4/2006 | Takahashi et al. |
| 7,042,825 B2 | 5/2006 | Yamamoto et al. |
| 7,065,535 B2 | 6/2006 | Tol et al. |
| 7,272,086 B2 * | 9/2007 | Hwang et al. ............ 369/47.14 |
| 2007/0183281 A1 * | 8/2007 | Hwang et al. ............ 369/47.14 |

FOREIGN PATENT DOCUMENTS

| | | |
|---|---|---|
| JP | 2002-329321 | 11/2002 |

OTHER PUBLICATIONS

U.S. Appl. No. 11/690,257, filed Mar. 23, 2007, Hwang et al., Samsung Electronics Co., Ltd.

U.S. Appl. No. 12/171.338, filed Jul. 11, 2008, Hwang et al., Samsung Electronics Co., Ltd.

Office Action issued in Chinese Patent Application No. 2006101431448 on Oct. 17, 2008.

* cited by examiner

FIG. 7

| PSN OF DEFECTIVE SECTOR | PSN OF SUBSTITUTE SECTOR |
|---|---|
| 100h | 11FFFh |
| 101h | 11FFEh |
| 102h | 11FFDh |
| ... | |
| 1FDh | 11F01h |
| 1FFh | 11F00h |

FIG. 8

| PSN OF DEFECTIVE SECTOR | PSN OF SUBSTITUTE SECTOR |
|---|---|
| 100h | 11EFFh |
| 101h | 11EFEh |
| 102h | 11EFDh |
| ... | |
| 1FDh | 11E01h |
| 1FFh | 11E00h |

METHOD OF OVERWRITING DATA IN WRITE-ONCE INFORMATION STORAGE MEDIUM AND DATA RECORDING AND/OR REPRODUCING APPARATUS FOR WRITE-ONCE INFORMATION STORAGE MEDIUM

CROSS-REFERENCE TO RELATED APPLICATIONS

This application is a continuation application of U.S. patent application Ser. No. 10/806,347 filed on Mar. 23, 2004, now issued as U.S. Pat. No. 7,272,086, the disclosure of which is incorporated by reference herein. This application also claims the benefit of Korean Patent Applications Nos. 2003-18213, 2003-60545, and 2004-14247, filed on Mar. 24, 2003, on Aug. 30, 2003, and on Mar. 3, 2004, respectively, in the Korean Intellectual Property Office, and the benefits of U.S. Patent Provisional Application Nos. 60/456,559 and 60/473,894, filed on Mar. 24, 2003 and May 29, 2003, respectively, in the U.S. Patent and Trademark Office, the disclosures of which are incorporated herein by reference.

BACKGROUND OF THE INVENTION

1. Field of the Invention

The present invention relates to write-once information storage media, and more particularly, to a method of overwriting data in a write-once information storage medium and a data recording and/or reproducing apparatus for the write-once information storage medium.

2. Description of the Related Art

Rewritable information storage media can be overwritten with new data in an area occupied with data. However, write-once information storage media can be written with information in a data-recordable area only once. Hence, data cannot be overwritten in write-once information storage media, and the already recorded data cannot be deleted or changed.

Typically, a predetermined area in a user data area of an information storage medium is set to store a file system including a variety of information about data recorded on the information storage medium.

In a rewritable information storage medium, an updated file system can be overwritten in a predetermined area occupied with an old file system, so that the area for storing file systems is fixed. On the other hand, write-once information storage media may not be overwritten. Accordingly, an updated file system must be written in an area other than the area where an old file system has already been recorded.

Since a conventional data recording and/or reproducing apparatus is designed to read out a file system from only a fixed area of an information storage medium, the conventional system cannot read out a file system from write-once information storage media, in which the location where a file system is recorded varies. In other words, a reproduction compatibility problem may occur. Furthermore, since a conventional data recording and/or reproducing apparatus writes every updated file system in a different area of a write-once information storage medium, the conventional apparatus may spend much time in searching for a final file system.

SUMMARY OF THE INVENTION

The present invention provides a method of overwriting data in a write-once information storage medium incapable of physical overwriting and a data recording and/or reproducing apparatus therefor.

The present invention also provides a method of logically overwriting data in a write-once information storage medium incapable of physical overwriting so that data is easily updated and/or read out, and a data recording and/or reproducing apparatus therefor.

According to an aspect of the present invention, a method of overwriting data in a write-once information storage medium comprises: receiving a command to overwrite new data in a first area of the write-once information storage medium where data has already been recorded; determining the first area as a defective area and recording the new data in a second area; and recording updated defect management information, including information about the locations of the first and second areas, in the write-once information storage medium.

According to an aspect of the present invention, a method of overwriting data in a write-once information storage medium comprises: receiving a logical address to store new data from a host; determining whether a first area with a physical address on the write-once information storage medium corresponding to the logical address is occupied with data and, if the first area is occupied with data, determining the first area as a defective area and recording the new data in a second area with a physical address different from the physical address of the first area; and recording updated defect management information, including the physical addresses of the first and second areas, in the write-once information storage medium.

According to another aspect of the present invention, a data recording and/or reproducing apparatus is provided, including a writer/reader and a controller. The writer/reader writes data to the write-once information storage medium or reads out the written data. When the controller receives a command to overwrite new data in a first area of the write-once information storage medium which is occupied with data, the controller determines the first area as a defective area and controls the writer/reader to record new data in a second area. The controller controls the writer/reader to write updated defect management information, including information about the locations of the first and second areas, in the write-once information storage medium.

According to another aspect of the present invention, a data recording and/or reproducing apparatus is provided, including a writer/reader and a controller. The writer/reader writes data to the write-once information storage medium or reads out the written data. The controller receives a logical address on the write-once information storage medium to store new data from a host, and determines whether a first area with a physical address on the write-once information storage medium corresponding to the logical address is occupied with data. If the first area is occupied with data, the controller determines the first area as a defective area and controls the reader/writer to write the new data in a second area with a physical address different than the physical address of the first area, and to write updated defect management information, including the physical addresses of the first and second areas, to the write-once information storage medium.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent and more readily appreciated from the following description of the embodiments taken in conjunction with the accompanying drawings in which:

FIG. 7 illustrates a defect list produced by a first logical overwriting according to the embodiment of FIGS. 6A through 6D; and FIG. 8 illustrates a defect list produced by a second logical overwriting according to the embodiment of FIGS. 6A through 6D.

DETAILED DESCRIPTION OF THE PREFERRED EMBODIMENTS

Figure 1:
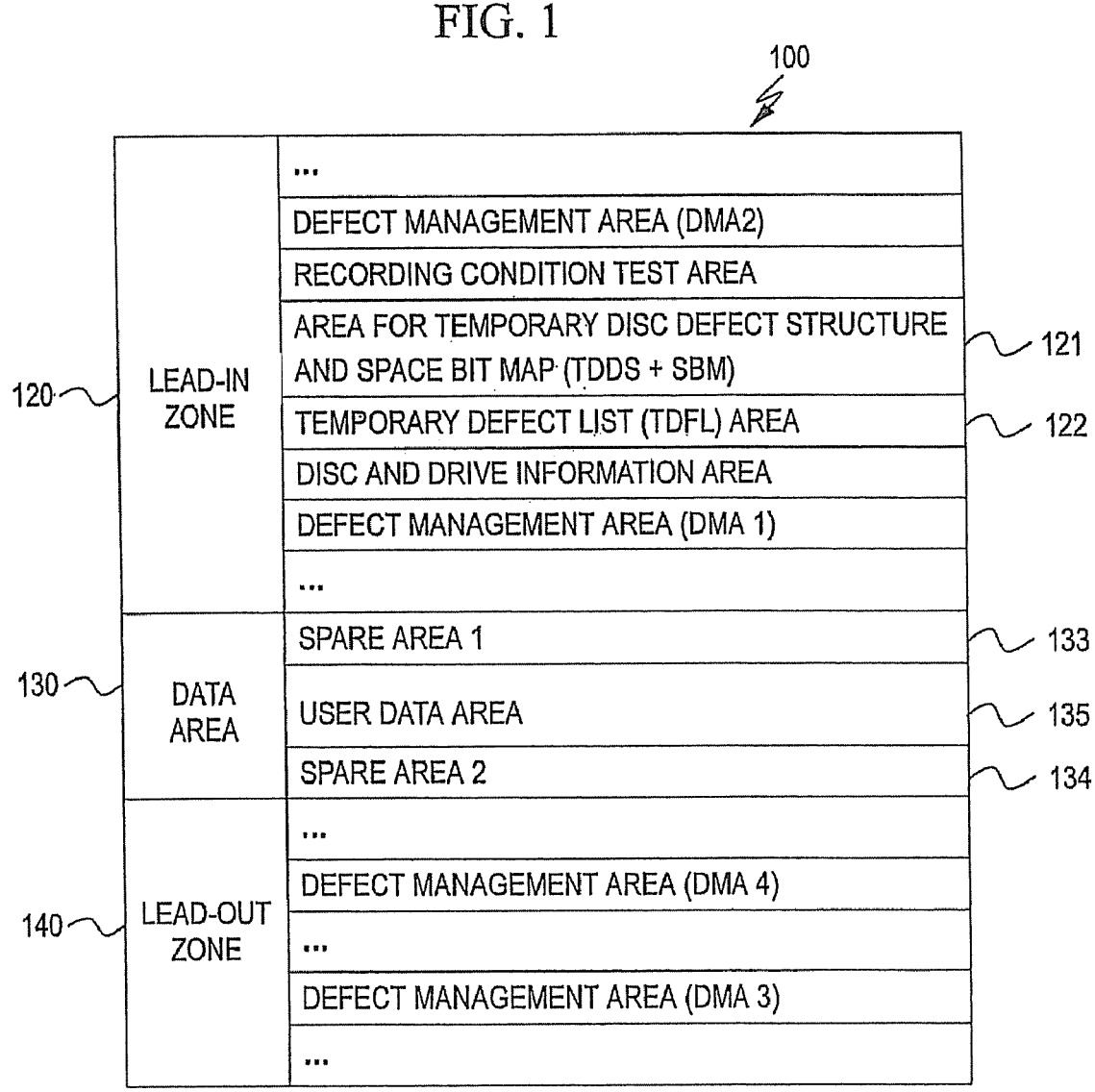
FIG. 1 illustrates a data structure of a write-once information storage medium having a single recording layer, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 illustrates a structure of a write-once disk information storage medium 100 having a single recording layer, according to an embodiment of the present invention. Referring to FIG. 1, the storage medium 100 comprises a lead-in zone 120, a data area 130 and a lead-out zone 140. An area 121 for recording both a temporary disc defect structure (TDDS) and a space bit map (SBM) is formed in the lead-in area 120. A separate area 122 for a temporary defect list (TDFL) is also formed in the lead-in area 120. Spare areas 1 and 2 (133 and 134, respectively) allocated to manage temporary disc defects are formed at the head and rear of the data area 130, respectively, to have predetermined sizes.

Alternatively, the area 121 for both the TDDS and the SBM may be formed in at least one of the lead-out area 140 and the data area 130.

Temporary disc defect management, spare areas allocated for temporary disc defect management, and an SBM will now be described in detail. Disc defect management denotes an operation in which, if a defect is generated in the user data recorded in a user data area 135, a new user data corresponding to the defective user data is recorded to compensate for the data lost due to the generated defect.

Disc defect managements are roughly classified as a disc defect management using a linear replacement technique or a disc defect management using a slipping replacement technique. In the linear replacement technique, if a defect is generated in a user data area of a data area, the defective area is replaced by a non-defective spare area allocated in the data area. In a slipping replacement technique, a defective area is skipped, i.e., not used, and instead a non-defective area is used.

The linear and slipping replacement techniques have been generally applied to information storage media that can record data several times in a random accessing method, such as, DVD-RAM/RW.

As illustrated in FIG. 1, the write-once information storage medium 100 according to an embodiment of the present invention also allocates the spare areas 1 and 2 (133, 134) in the data area 130 to perform defect management using the linear replacement technique. The spare areas 1 and 2 (133, 134) in the data area 130 are allocated according to a command of a data recording and/or reproducing apparatus or a host when the write-once information storage medium is initialized to be used.

When an information storage medium is loaded on a data recording and/or reproducing apparatus, the data recording and/or reproducing apparatus reads out information stored in lead-in and/or lead-out areas and ascertains how to manage the medium and how to record or reproduce data on the medium. As an amount of information recorded in the lead-in and/or lead-out areas increases, a time required for preparation for data recording or reproduction, after information storage medium loading, increases. To reduce the time required for data recording and/or reproduction preparation, the write-once information storage medium 100 of FIG. 1 uses temporary management data, which includes TDDS and TDFL.

A TDDS may include a TDDS identifier, an update counter, data about a location where a final TDFL has been recorded, data about a location where final disc and drive information has been recorded, data about a size of a spare area to replace a defective cluster, and the like.

A TDFL may include a TDFL identifier, an update counter, defect factors, a number of the defect factors, and the like. The defect factors include state data, data about locations of defective clusters, and data about locations of substitute clusters. The state data may indicate substitute data, types of the defective clusters, and the like. The types of defective clusters may include defective clusters necessary to be replaced, defective clusters unnecessary to be replaced, and clusters that are likely to be defective, and the like.

The write-once information storage medium 100 of FIG. 1 stores an SBM which is "recording-status" data, which indicates whether data has been recorded in cluster units on the write-once information storage medium. The SBM is formed by allocating a bit value of 0 to occupied clusters and a bit value of 1 to unoccupied clusters.

Accordingly, a data recording and/or reproducing apparatus can quickly check the recording status of the write-once information storage medium 100 of FIG. 1 by referring to a finally-updated SBM, thereby increasing an efficiency of the use of the medium.

Although the write-once information storage medium 100 of FIG. 1 stores the SBM together with a TDDS in one cluster, the present invention is not limited by this embodiment.

Since the SBM indicates whether data has been recorded in cluster units in the write-once information storage medium 100, the SBM must be finally updated after all other data including user data is recorded.

Figure 2:
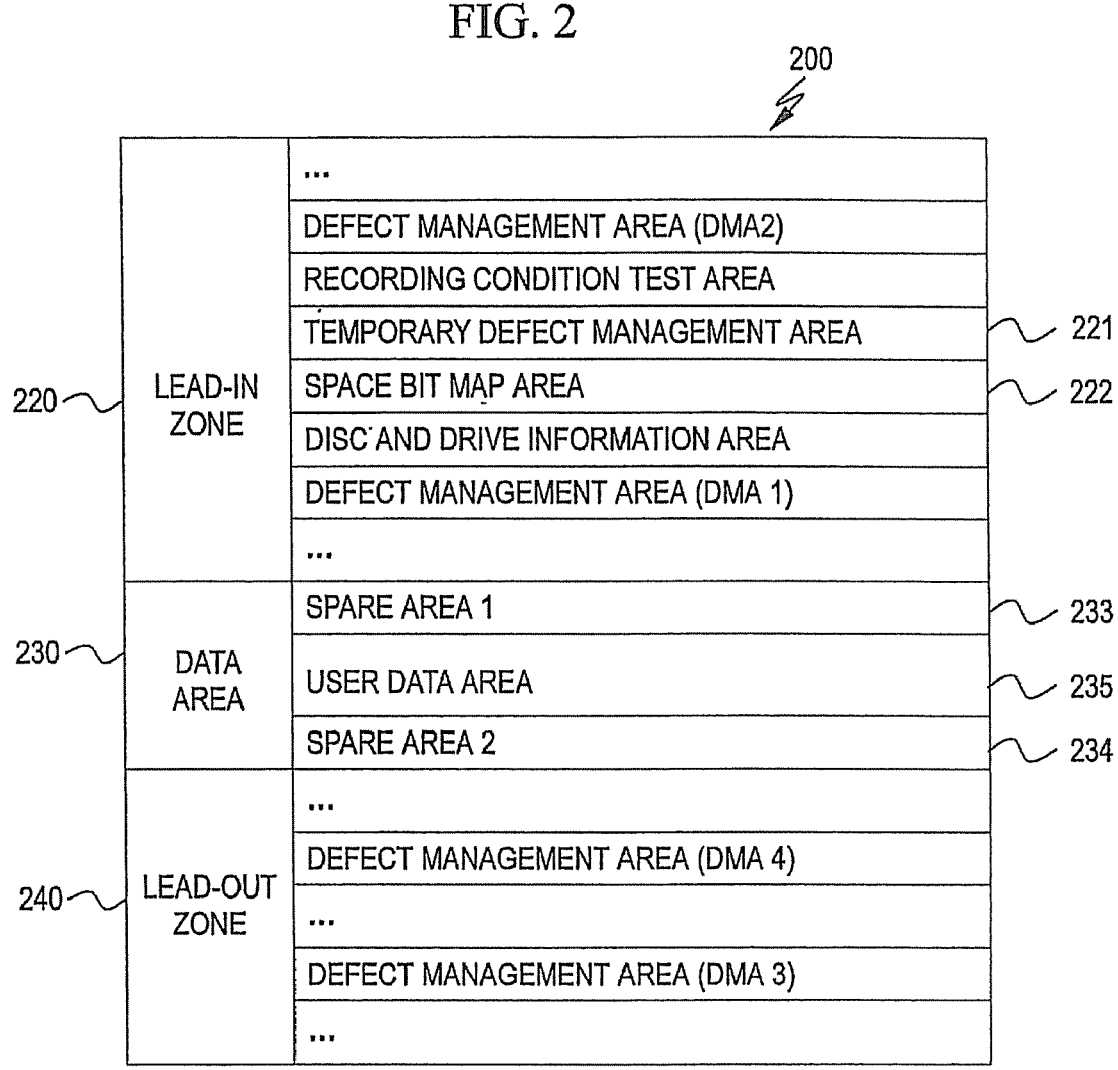
FIG. 2 illustrates a data structure of a write-once information storage medium having a single recording layer, according to another embodiment of the present invention.

FIG. 2 illustrates a structure of a write-once information storage medium 200 having a single recording layer, according to another embodiment of the present invention. Referring to FIG. 2, the storage medium 200 comprises a lead-in zone 220, a data area 230 and a lead-out zone 240. A temporary disc management area (TDMA) 221 and an SBM area 222 are separately allocated in the lead-in area 220. Spare areas 1 and 2 (233 and 234, respectively) used for managing temporary disc defects are allocated at the head and rear of the data area 230, respectively, to have predetermined sizes, and bound a user data area 235.

The TDMA area 221 is provided to store the TDDS and the TDFL and the SBM area 222 is provided to store the spice bit map data in a similar manner as described above.

Figure 3A:
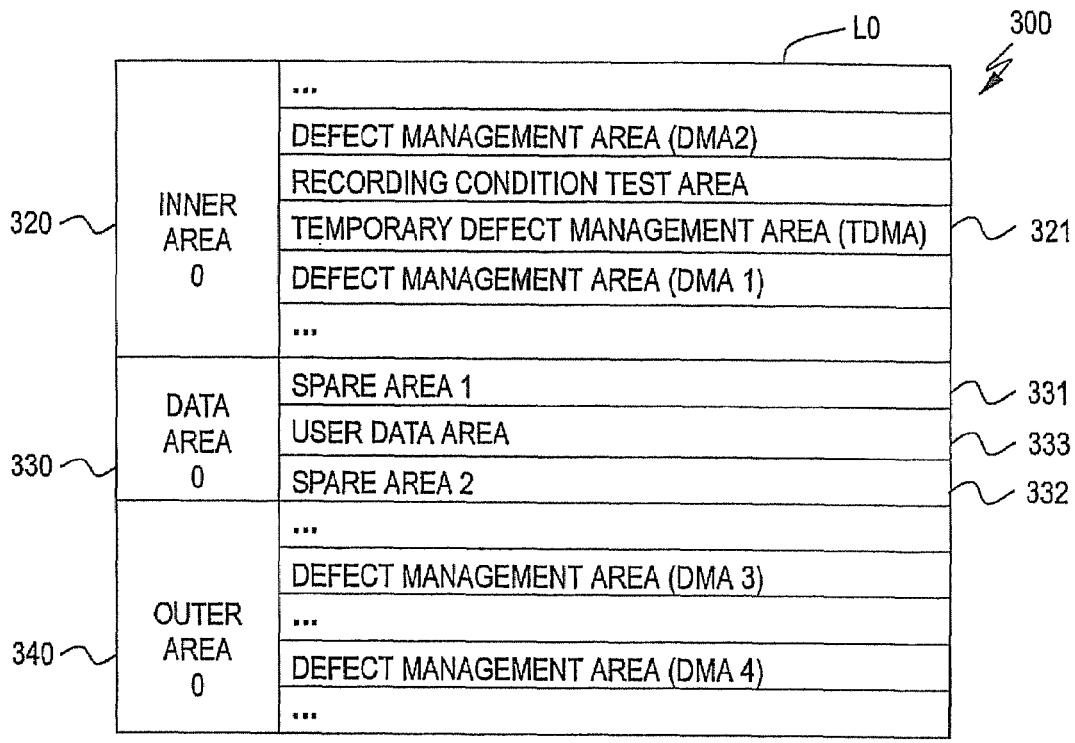
FIGS. 3A and 3B illustrate a data structure of a write-once information storage medium having two recording layers, according to still another embodiment of the present invention.
Figure 3B:
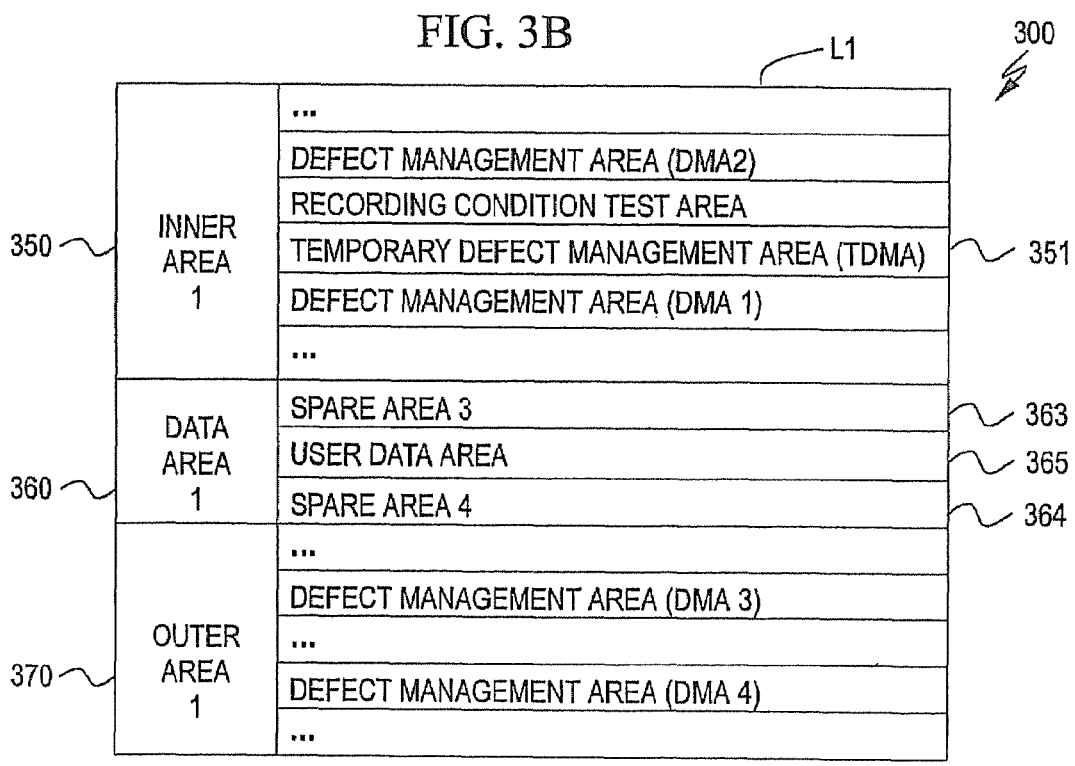

FIGS. 3A and 3B illustrate a data structure of a write-once information storage medium 300 having first and second recording layers L0 and L1, according to still another embodiment of the present invention. FIG. 3A illustrates a structure of the first recording layer L0, and FIG. 3B illustrates a structure of the second recording layer L1. The structure of FIG. 3A may be considered as a structure of a write-once recording medium having a single layer.

The data structure of the first recording layer L0 of FIG. 3A is similar to that of the write-once information storage medium 200 of FIG. 2 except that the SBM is stored in a temporary defect management area (TDMA) 321, together with a TDDS and a TDFL, instead of being stored in a separate area. The structure of the second recording layer L1 of FIG. 3B is the same as that of the first recording layer L0 of FIG. 3A. An inner area 0 (321) comprises the TDMA 321 of the first recording layer L0 and an inner area 1 (350) comprises a TDMA 351 of the second recording layer L1. A data area 0 (330) comprises a spare area 1 (331), a user data area 331 and a spare area 2 (332). A data area 1 (360) comprises a spare area 3 (363), a user data area 365 and a spare area 4 (364).

Figure 4A:
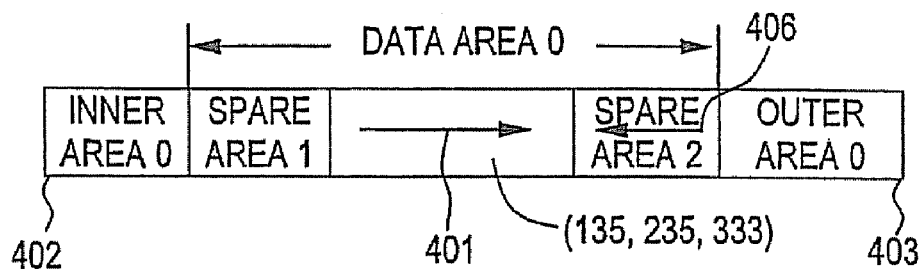
FIGS. 4A and 4B illustrate directions in which spare areas are used according to the present invention.
Figure 4B:
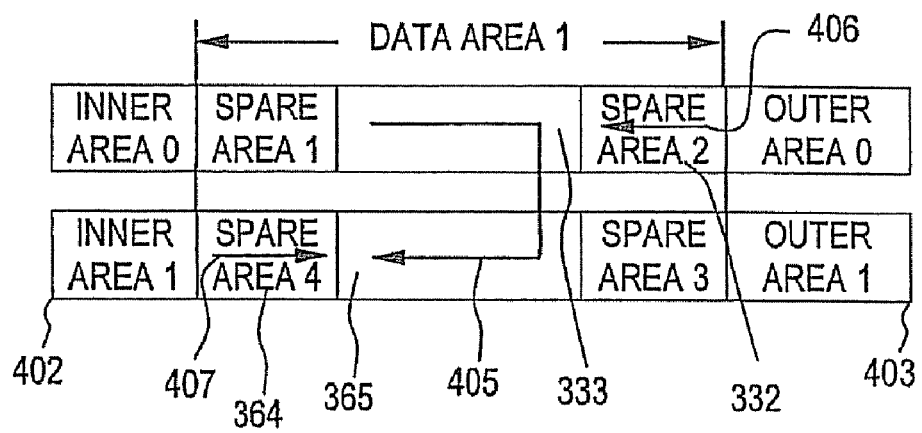

FIGS. 4A and 4B illustrate directions in which spare areas (133, 134, 233, 234, 331, 332, 363, 364) are used according to the present invention. FIG. 4A refers to a write-once recording medium (e.g., 100, 200) having a single recording layer, and FIG. 4B refers to a write-once recording medium (e.g., 300) having two recording layers (i.e., first and second recording layers). Referring to FIGS. 4A and 4B, in the first recording layer (or the single recording layer), a data area excluding spare areas, that is, the user data area (135, 235, 333), is used in a direction 401 from an inner boundary 402 to an outer boundary 403 of the recording medium (100, 200, 300). In the second recording layer, the user data area 365 is used in a direction 405 from the outer boundary 403 to the inner boundary 402 of the recording medium 300.

As shown in FIG. 4A, spare area 2 (135, 235, 333) is used in a direction 406 which is opposite to the recording direction 401 of user data, that is, in the direction from the outer boundary 403 to the inner boundary 402 of the recording medium (100, 200, 300), so as to be easily extended. As shown in FIG. 4B, spare area 4 (364) is used in a direction 407 from the inner boundary 402 to the outer boundary 403 of the recording medium 300 so as to be easily extended.

As described below, a write-once information storage medium according to the present invention may need a wider spare area than conventional information storage media in order to perform logical overwriting using defect management according to the present invention. Accordingly, it is preferable, but not necessary, to extend a spare area upon initialization of the information storage medium or during use of the information storage medium. In order that a spare area may be extended during the use of the information storage medium, data is preferably, but not necessarily, recorded in the spare area in a direction opposite to the recording direction of user data as illustrated in FIGS. 4A and 4B.

Methods of overwriting data in the write-once information storage medium according to two embodiments of the present invention, will now be described with reference to the information storage medium 300 shown in FIGS. 3A and 3B.

In an overwriting method according to an embodiment of the present invention, data may be overwritten in a write-once information storage medium incapable of being physically overwritten by using a logical overwriting technique.

Figure 5:
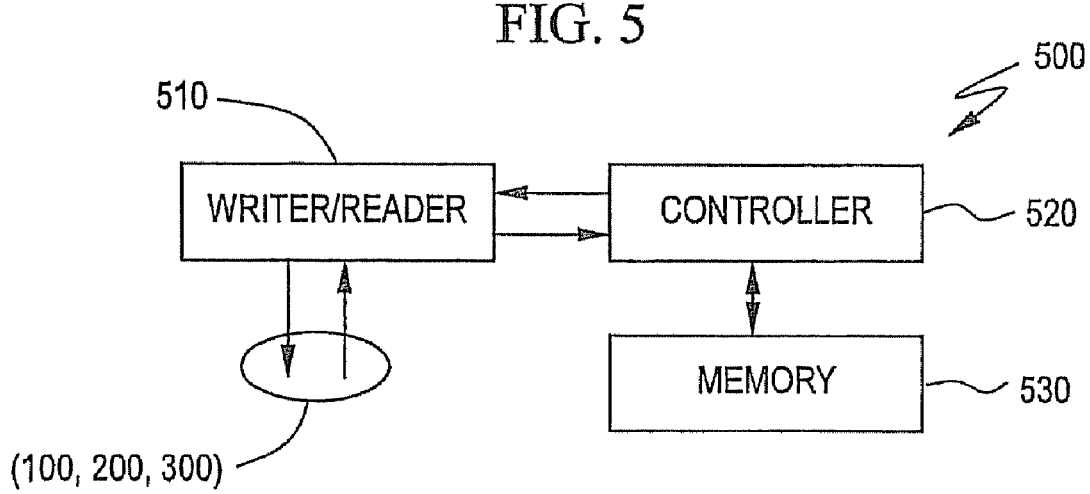
FIG. 5 is a block diagram of a data recording and/or reproducing apparatus according to an embodiment of the present invention.

FIG. 5 is a block diagram of a data recording and/or reproducing apparatus 500 according to an embodiment of the present invention. As illustrated in FIG. 5, the apparatus 500 comprises a writer/reader 510, a controller 520, and a memory 530. The write-once information storage medium 300 is the same as the write-once information storage medium of FIG. 3A.

The writer/reader 510 writes data to the write-once information storage medium 300 under control of the controller 520 and reads out the written data from the write-once information storage medium 300 to verify the same.

Upon recording and/or reproducing of data on the write-once information storage medium 300, the controller 520 performs defect management using a TDMA that is included in the write-once information storage medium 300.

The controller 520 follows a verifying-after-writing course, in which after data is recorded in predetermined units in the write-once information storage medium 300, the recorded data is verified to find defective data. Accordingly, the controller 520 records user data in predetermined units and verifies the recorded user data to identify defective data. The controller 520 produces a TDFL, which indicates the area where the defective data found during verification is stored, and a TDDS. The controller 520 stores the TDFL and the TDDS in the memory 530, collects a predetermined amount of TDFL and TDDS, and writes the collected TDFL and TDDS to the TDMA 321 allocated in the write-once information storage medium 300.

The above-described overwriting of data in the write-once information storage medium 300 by the data recording and/or reproducing apparatus 500 of FIG. 5 will now be described in greater detail by taking an updated file system as an example of the data to be overwritten.

If the data recording and/or reproducing apparatus performs defect management to record and/or reproduce data on a write-once information storage medium, a file system recorded on the write-once information storage medium may be updated by the defect management. In other words, the data recording and/or reproducing apparatus 500 receives data about an updated file system and a logical address of the write-once information storage medium to store the updated file system data from a host and then checks from the SBM whether a physical address corresponding to the logical address is occupied with data. The SBM is previously read out from the write-once information storage medium by the writer/reader 510 and stored in the memory 530. If a determination is made that the physical address is occupied with data, the area with the physical address is determined as a defective area. Then, the updated file system is recorded in a spare area allocated to replace a defective area.

If the data recording and/or reproducing apparatus 500 does not use such an SBM, the recording and/or reproducing apparatus 500 may decide an occupied area of data as a defective area through the verifying-after-writing method and then record the updated file system in the spare area. Thereafter, an updated TDDS and an updated TDFL are recorded in the TDMA 321.

FIGS. 6A through 6D illustrate a method of overwriting an updated file system in the write-once information storage medium 300. In the method described with reference to FIGS. 6A-6D, the first and second spare areas 331 and 332 are identified as SA1 and SA2 and are allocated at a head and a rear of the data area (e.g., data area 330). Also, an area for storing a file system is allocated to the head of a user data area 335.

Figure 6:
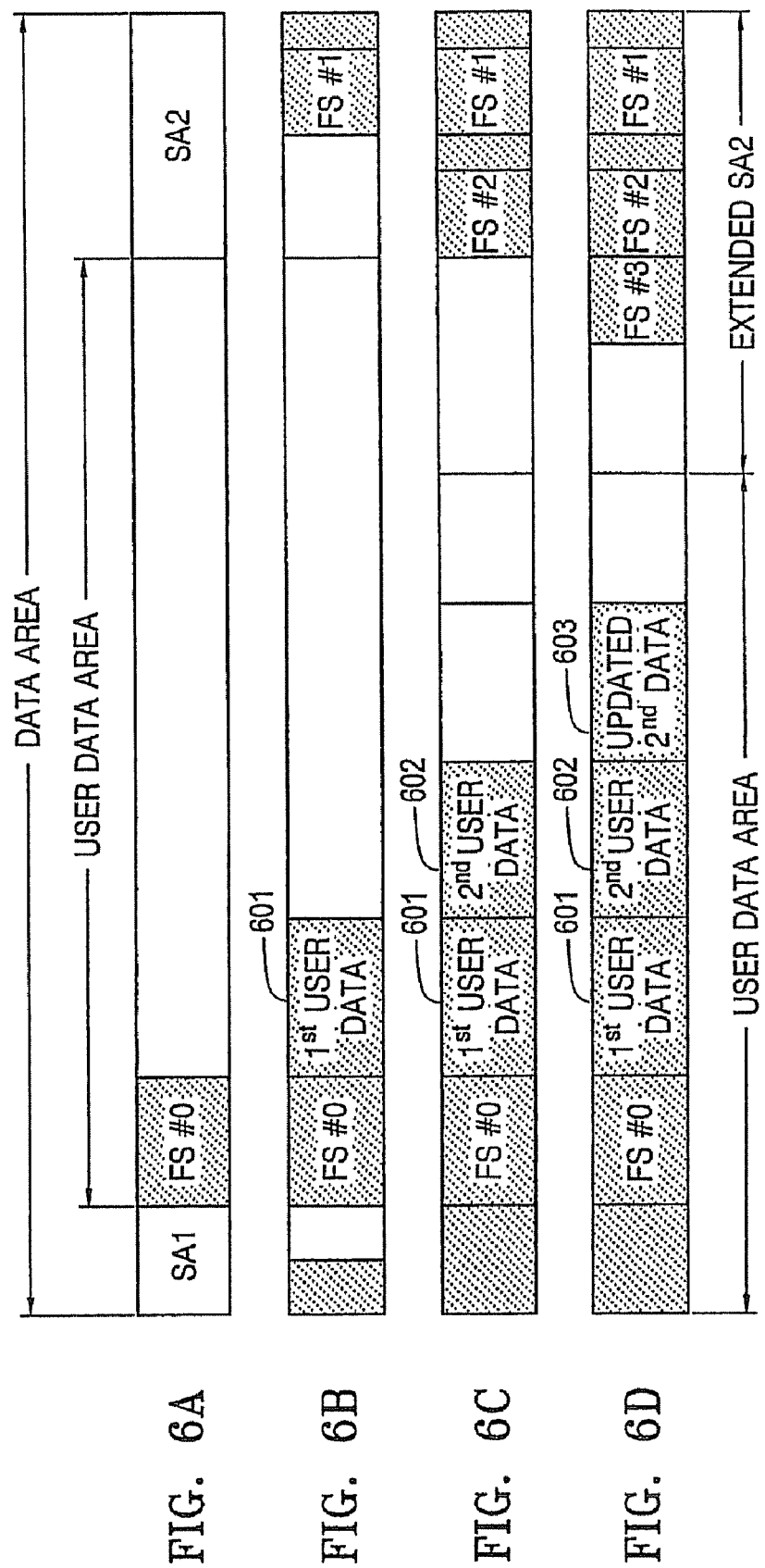
FIG. 6A through 6D illustrate a method of overwriting an updated file system in a write-once information storage medium 100, according to an embodiment of the present invention.

In FIG. 6A, an initial file system FS #0 is recorded in an area ranging from the head of the user data area (335) to a predetermined location. In FIG. 6B, a first user data 601 is recorded next to the initial file system FS #0 in the user data area 335, and then a first updated file system FS #1 produced after defect management is recorded in the second spare area SA2 according to the overwriting method of the above-described embodiment of the invention. In FIG. 6C, a second user data 602 is recorded next to the first user data 601 in the user data area, and then a second updated file system FS #2 is recorded next to the first updated file system FS#1. In FIG. 6D, updated second user data 603 is recorded next to the second user data 602 in the user data area 335, and then a third updated file system FS #3 is recorded next to the second updated file system FS#2.

The second spare area SA2 of FIG. 6D is extended from the second spare area SA2 shown in FIGS. 6A through 6C. In other words, when the second spare area SA2 of FIG. 6A is used up, the second spare area SA2 of FIG. 6A may be extended by re-initializing the write-once information storage medium 300. To easily extend a spare area such as the SA2, a direction in which the spare area is used, that is, a direction in which data is recorded in the spare area, is made opposite to a direction in which data is recorded in a user data area, e.g., 335.

Even though the above-described logical overwriting continues on an identical logical sector number (LSN), the amount of data included in a defect list does not increase. For example, it is assumed that LSNs corresponding to physical sector numbers (PSNs) 100h to 1FFh in a user data area are 00h through FFh and that an initial file system is recorded in the PSNs 100h through 1FFh. An LSN indicates a logical sector address, and a PSN indicates a physical sector address.

In this case, as additional user data is recorded in the write-once information storage medium 300, a host issues a command to the data recording and/or reproduction apparatus 500 of FIG. 5 to overwrite a first updated file system in the LSNs 00h through FFh where the initial file system has been recorded. The data recording and/or reproduction apparatus determines sectors corresponding to the PSNs 100h through 1FFh as defective areas if it is determined using an SBM or through a verifying-after-writing process that the LSNs 00h through FFh are occupied with data. Then, the data recording and/or reproduction apparatus records the first updated file system (FS #1) in a spare area (e.g., SA2). FIG. 7 illustrates a defect list produced by a first logic overwriting in the method of FIGS. 6A through 6D. Referring to FIG. 7, the sectors corresponding to the PSNs 100h through 1FFh where the initial file system is recorded are determined as defective sectors, and substitute sectors for the defective sectors are PSNs 11FFFh through 11F00h in a spare area (e.g., SA2).

When a firstly-updated file system is recorded in the sectors LSN 00h through FFh by a first logic overwriting and then additional user data is recorded on a write-once information storage medium, a host commands the data recording and/or reproducing apparatus to overwrite a secondly-updated file system in the sectors LSN 00h through FFh. The data recording and/or reproduction apparatus determines the sectors corresponding to the PSNs 100h through 1FFh as defective areas when it is determined that the sectors corresponding to the LSNs 00h through FFh are occupied with data using an SBM or through a verifying-after-writing process. Then, the data recording and/or reproduction apparatus 500 records the secondly-updated file system (e.g., FS #2) in a spare area (e.g., SA2).

FIG. 8 illustrates a defect list produced by a second logic overwriting in the method of FIGS. 6A through 6D. Referring to FIG. 8, the sectors corresponding to the PSNs 100h through 1FFh where the initial file system is recorded are determined as defective sectors, and substitute sectors for the defective sectors are PSNs 11EFFh through 11E00h in a spare area (e.g., SA2).

Compared with the defect lists of FIGS. 7 and 8, although a defect list is generated every time overwriting is performed on an identical LSN, only the PSN of the substitute sectors included in each of the defect lists is changed without an increase in the amount of data contained in each of the defect lists.

A method of overwriting data in a write-once information storage medium, according to another embodiment of the present invention, will now be described. In this embodiment, the data overwriting is performed using a file system.

To perform this overwriting, the data recording and/or reproducing apparatus 500 of FIG. 5 receives a command from a host to reproduce data recorded in sectors LSN 0h through FFh, accesses a PSN, for example, 100h through 1FFh, corresponding to the LSN to read out data, and transmits the read-out data to the host.

When the host tries to correct data received from the data recording and/or reproducing apparatus and then record the corrected data in the write-once information storage medium or to additionally record the data received from the data recording and/or reproducing apparatus in the write-once information storage medium 300, the data recording and/or reproducing apparatus 500 transmits an SBM, defect information, and the like to the host. The host distinguishes a data-recordable area from a data-unrecordable area in consideration of the state of a user data area (e.g. 333) to which data is logically allocated and the physical recording status of the user data area by referring to the SBM, the defect information, and the like, thereby selecting an overwritable area. In other words, a feature of the overwriting method according to this embodiment of the invention is that the host selects an overwritable area.

The overwriting method according to the latter embodiment of the invention is suitable for write-once information storage media having a user data area with a large storage capacity. The overwriting method according to the former embodiment of the invention can prevent a consumption of a user data area by overwriting new data in a spare area for use in defect management.

As described above, in the present invention, overwriting can be performed in write-once information storage media, which is incapable of physical overwriting, by using a logical overwriting technique. Thus, data recorded in write-once information storage media may be changed or updated. Also, when data required to be recorded in a fixed area of a write-once information storage medium, for example, a file system, is updated, the updated file system is recorded in a physical address different from the physical address where the original file system has been recorded, but the logical address where the updated file system is recorded is the same as that where the original file system has been recorded. Thus, the host recognizes that the file system is always recorded in a fixed area, thus easily accessing and reproducing the file system.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of overwriting data in a write-once information storage medium, the method comprising:

receiving a logical address to store new data from a host;

determining whether a first area with a physical address on the write-once information storage medium corresponding to the logical address is occupied with data and, if the first area is occupied with data, determining the first area as a defective area and recording the new data in a second area with a physical address different than the physical address of the first area; and recording updated defect management information, including the physical addresses of the first and second areas, in the write-once information storage medium.

2. The method of claim 1, wherein the recording of the new data comprises determining whether the first area is occupied with data, using recording-status information that represents the recording status of the write-once information storage medium by distinguishing occupied areas of data from unoccupied areas.

3. The method of claim 2, wherein the recording-status information is a bit map produced by allocating different bit values to occupied and unoccupied clusters of the write-once information storage medium.

4. The method of claim 1, wherein the determining the first area comprises writing the new data to the first area and thereafter verifying the written new data, and determining the first area as a defective area according to a result of the verification of the new data.

5. The method of claim 1, wherein data previously recorded in the first area is a previous file system, and the new data to be recorded in the second area is an updated file system.

* * * * *